Feb. 16, 1943.　　R. M. THOMAS ET AL　　2,311,004
CORROSION PROOF LINER
Filed Feb. 27, 1942　　2 Sheets-Sheet 1
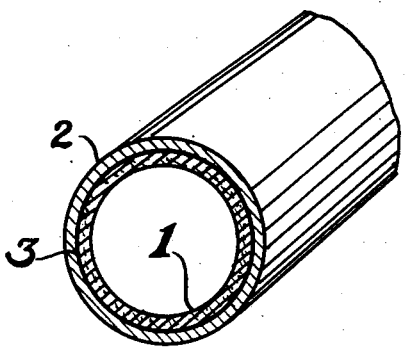
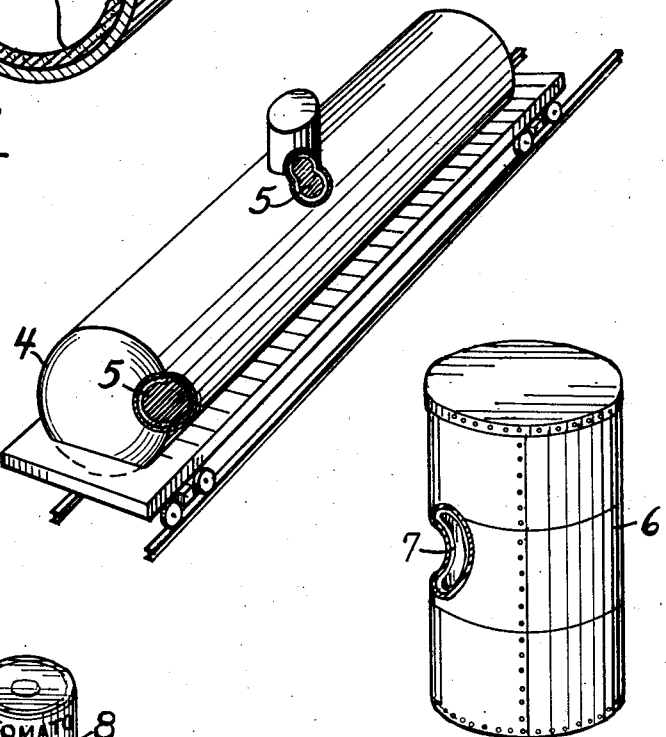
Robert M. Thomas
William J. Sparks Inventors
By P. L. Young Attorney Robert M. Thomas
William J. Sparks Inventors
By P. L. Young Attorney Patented Feb. 16, 1943

2,311,004

UNITED STATES PATENT OFFICE 2,311,004

CORROSIONPROOF LINER

Robert M. Thomas, Union, and William J. Sparks, Cranford, N. J., assignors, by mesne assignments, to Jasco, Incorporated, a corporation of Louisiana Application February 27, 1942, Serial No. 432,630

11 Claims. (Cl. 220—64)

This invention relates to containers, and particularly to containers having a corrosion-proof lining which is resistant to acids, alkalies, oxygen-containing and water-soluble substances generally; and relates especially to a container having a lining of a polymer substance made up of a cured, predominately isoolefinic, polymer or interpolymer of an isoolefin and a diolefin.

The problem of containers, ducts and handling equipment for corrosive fluids has been one of the most difficult which the chemist has been called upon to solve. The problem of ducts and containers, such as tanks and particularly large portable containers such as tank cars, for holding corrosive liquids such as strong sulfuric, hydrochloric and nitric acids, as well as the weaker acids and alkalies, has proven to be particularly difficult since none of the obtainable metals are fully resistant to concentrated sulfuric or concentrated nitric acid, nor to strong caustic solution, and accordingly a metal container contaminates the contained liquids in a very short time, and the container itself is destroyed or punctured in a relatively short time. Attempts have been made to line tanks with various resistant materials such as rubber, glass, various enamels, etc., but to the present without entire success. Glass coated surfaces are subject to chipping and the smallest puncture in the glass lining results in immediate contamination of the contained fluid, and an early failure of the container by puncture of the metal wall. Rubber linings in such containers do not at all withstand the attacks of acid, and especially with stronger nitric and sulfuric acids, the deterioration is exceedingly rapid to failure within relatively few hours, making the liner useless for such strong acids.

The present invention provides a new and useful lining material which has the unexpected combination of properties of being wholly resistant to any concentration of any of the acids, alkalies, salts or other aqueous liquids, of being solid, elastic, flexible, of high abrasion resistance and high flexure capacity; and the further properties of being readily bonded to metal surfaces, and of staying firmly and uniformly in place therein without displacement by gravity stresses or hydraulic pressures.

This corrosion-resistant lining material is a cured, predominately isoolefinic polymer or interpolymer of an isoolefin such as methyl ethyl ethylene, isopropyl ethylene, or especially iso-butylene with a diolefin such as butadiene, isoprene, piperylene, dimethylbutadiene, hexatriene, diisobutenyl, 2-methyl-hexadiene 1-5; 2,4,6-trimethyl-1,3,5-heptratriene, myrcene, divinyl acetylene, and similar compounds.

The isoolefin and the diolefin are mixed in proportions ranging from 70 to 99½ parts of the isoolefin with 30 to ½ parts of the diolefin and polymerized together at low temperature to produce a high molecular weight polymer which is thereafter compounded with appropriate fillers and curing agents, then placed in position within the container or duct; and cured by heat treatment, either before or after placing.

Thus the invention consists of a container or duct having a compounded and cured olefinic polymer substance lining; and an object of the invention is to protect a corrodible body by the application thereto of a corrosion-resistant polymerized olefinic substance; which substance desirably consists of a cured high molecular weight linear polymer, which polymer desirably contains in addition various compounding and curing substances; and provides a high resistance to acids and alkalies, high elasticity and high abrasion and flexure resistance.

This application is a continuation in part of our co-pending applications Serial No. 182,252, filed December 29, 1937; Serial No. 248,526, filed December 30, 1938, and Serial No. 300,336, filed October 20, 1939.

Other objects and details of our invention will be apparent from the following description when read in connection with the accompanying drawings wherein Fig. 1 is a view in cross section of a duct structure having a lining according to the invention;

Fig. 2 is a perspective view partly in section of a portable container structure according to the invention;

Fig. 3 is a perspective view partly in section of a fixed container structure according to the device of the invention;

Fig. 4 is a perspective view partly in section of a small container for comestibles according to the invention;

Figure 5:
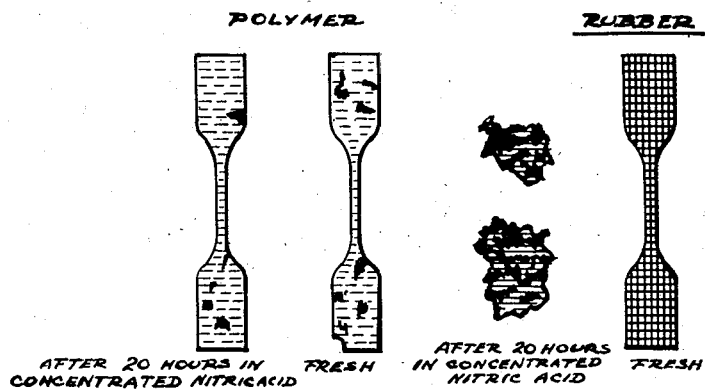
Fig. 5 is a view of comparative test experiments on rubber and the polymer substance before and after submergence for 20 hours in concentrated nitric acid.

Broadly the structure of the invention consists of a duct or tank which may be of metal or wood or ceramic material as desired, protected by a coating of a new, predominately isoolefinic polymer in a cured condition.

The liner material which is an element of the invention is conveniently produced from waste gases resulting from the cracking of petroleum hydrocarbons. As is well known, crude petroleum is topped for gasoline and fractionated to separate a cracking stock, which is cracked at high pressure and temperature to convert a substantial portion into gasoline boiling range hydrocarbons. About 15% of the input cracking oil leaves the process in the form of gases consisting of hydrogen; substantial amounts of the lower saturated hydrocarbons of the methane series; substantial quantities of the ethylene series of unsaturated hydrocarbons, and smaller quantities of other unsaturated compounds. This mixture is fractionated to separate the isobutylene from the mixture.

The isobutylene, preferably carefully purified, is then subjected to a low temperature polymerizing reaction, in admixture with a diolefin as above pointed out, for the production of an interpolymerizate, which cures readily with sulfur, especially in the presence of a limited number of sulfurization aids. The olefins such as the simple isobutylene above mentioned are mixed in the desired proportions with a diolefin and then cooled to temperatures ranging from $-10°$ C. to $-103°$ C. or even lower to temperatures as low as $-150°$ or $-165°$ C.

The cold, mixed olefinic material is then treated with a dissolved active metal halide catalyst, or Friedel Crafts type catalyst, such as aluminum chloride, aluminum bromide, titanium tetrachloride, zirconium tetrachloride, alkyl aluminum chloride, and the like, dissolved in a low freezing inert solvent characterized by a freezing point below about $0°$ C. (it is not necessary that the freezing points of the catalysts solvents be in every instance below the polymerization temperature, since the catalyst solution may be dissolved in the polymerization mixture even though the freezing point is somewhat above the polymerization temperature) and a substantial solubility for the active metal halide substances. Convenient substances for this reaction are the various alkyl halides such as ethyl, methyl, propyl and butyl chlorides, ethylene dichloride, chloroform, isopropyl chloride, normal butyl chloride, tertiary butyl chloride, carbon disulfide, methyl dichloride, ethyl, propyl and butyl polychlorides and their analogous bromides (especially with aluminum bromide). The catalyst solution is preferably applied in the form of a spray to the surface of the rapidly stirred reaction mixture, or it may be mixed directly with the reaction mixture or combined in other ways as will be obvious to a chemist.

At these temperatures a rapid polymerization reaction occurs to produce a solid interpolymer substance which has relatively very few unsaturated bonds between carbon atoms, as is shown by the low iodine number. The resulting interpolymer is freed from the catalyst and may be subjected to other purification steps if desired. At room temperature it is a solid, with an elasticity and elongation comparable to that of rubber. It is, however, chemically very different from rubber, because of the relatively high degree of chemical saturation as compared to rubber.

The resulting interpolymer desirably has a molecular weight above about 15,000, up to about 500,000, and preferably has a molecular weight above about 30,000 and within the range of 30,000 to 150,000. The raw interpolymer has an iodine number ranging from 0.01 to 50 or 60, depending upon the molecular weight and the amount of diolefin interpolymerizate, the polymer having the smallest amount of interpolymerized diolefin having the lowest iodine number, especially when it has extremely high molecular weight; and the interpolymer with larger amounts of the diolefin having the higher iodine numbers, especially when of medium molecular weight and containing a relatively large proportion of interpolymerized diolefin.

The interpolymer combines with sulfur, in which characteristic it is sharply different from simple polyisobutylene. The amount of sulfur which can be combined into the molecules of the interpolymer substance is, however, relatively small, and when this small amount of sulfur has been combined, the material is fully saturated chemically and is still more highly resistant to oxidation, and still more highly resistant to acids and alkalies. Moreover, when sulfur is combined into the interpolymer to the saturation point, it retains its elongation and elasticity, in sharp contrast to rubber, which when fully saturated with sulfur is a hard, brittle substance. Furthermore, it has a chemical inertness which is of a wholly different order of magnitude from that of rubber.

The interpolymer can also be cured with a quinonoid material such as para-quinone dioxime and when so cured shows a tensile strength within the range of 500 to 3200 pounds per square inch. The interpolymer, when cured with sulfur and a curing aid, shows a tensile strength within the range of 1000 to 4500 pounds or higher.

The interpolymer, when cured with the quinonoid curing agent, similarly is fully saturated, retains a good elongation and elasticity, has a high strength, substantially no cold flow, and a high chemical inertness which also is of wholly different magnitude from that of rubber and higher than that of uncured polyisobutylene.

Figure 6:
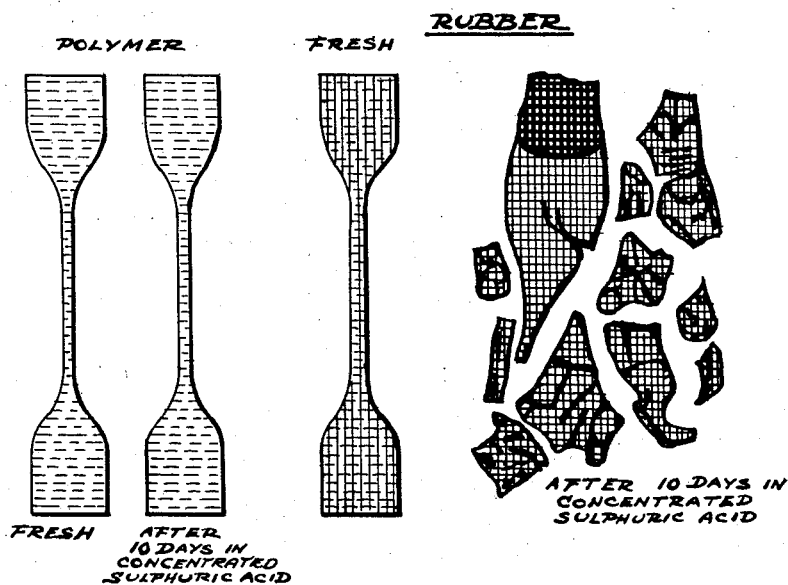
Fig. 6 is a similar view of comparative test experiments on rubber and the polymer substance before and after submergence for 10 days in concentrated sulfuric acid.

The acid resistant property of the cured polymer is indicated in Figs. 5 and 6. Fig. 5 shows samples of the sulfurized interpolymer substance before and after twenty hours' exposure to submergence in strong nitric acid at room temperature. It shows that no perceptible attack has occurred from the nitric acid on the polymer substance. In fact weeks, and even months, of contact with nitric acid produce no perceptible reaction by the acid upon the interpolymer substance. In contrast to this, as shown in Fig. 5, vulcanized rubber is completely disintegrated by concentrated nitric acid in the course of twenty hours' exposure. That is, two-thirds to three-fourths of the rubber material is dissolved in the nitric acid, and the small amount of insoluble filler material remains as merely a small amount of debris. Similarly in Fig. 6, the interpolymer material is wholly resistant to concentrated sulfuric acid, whereas, as shown, rubber is charred, swollen, and generally disintegrated by ten days' immersion in the concentrated sulfuric acid.

The interpolymeric material is desirably compounded according to the following formula:

| | Parts |
|---|---|
| Isoolefinic-diolefinic interpolymer | 100 |
| Zinc oxide | 5 |
| Tuads | 1 |
| Sulfur | 1.5 |
| Stearic acid | 3 |
| Carbon black | 10 |

It will be observed that the four parts of sulfur per hundred parts of interpolymer substance substantially completely saturates the material chemically, and contributes markedly to its chemical resistivity. It is further to be observed, however, that this condition of chemical saturation does not injure the flexibility or elasticity of the material and does not injure any of its advantageous properties, but on the contrary, improves and increases these properties. That is, the chemical saturation increases both the physical strength and abrasion resistance of the material, still further increases its chemical resistivity to attack by the various reagents, and reduces any tendencies towards tackiness or cold flow.

(The "Tuads" mentioned in the above formula is tetramethylthiuram disulfide which aids and facilitates the sulfurization.)

The above composition is conveniently prepared on the open roll mill, the interpolymer as such being put on the mill and milled until it "bands," and then the other substances are added rapidly and mixed in by cutting the compound across the face of the mill from side to side. The compounding, especially if the quinonoid material is used, is preferably conducted at a mill temperature below 70° C. The quinonoid material, when it is used, and the sulfurizations aids otherwise, are preferably added at the end of the mixing operation, and at the lowest possible temperature.

The material may be sheeted out upon a roll mill after the compounding, and may be applied to the interior of the container in the form of sheets which are caused to become adherent to the metal of the container by the preliminary application to the surface of the container of a thin layer of the compounded polymer dissolved in a suitable solvent such as a light hydrocarbon or chlorinated hydrocarbon. Alternatively, the adhesion may be obtained by the use of a layer of sulfonated rubber applied to the container material, either with or without the presence of substantial quantities of carbon black.

The compounded interpolymer material in sheet form may then be applied to the surface of the container after the solvent has substantially evaporated from the first layer. The joints between successive strips of the interpolymer material may be closed by the application of material in solution, or by working the edges together with a roller in a manner closely analogous to that used for wallpaper. When the lining is completed, the container may be heated, preferably under pressure, to a temperature in the neighborhood of 100° C. to 200° C. for a period of 10 to 90 minutes which is sufficient to cause the combination of the sulfur with the interpolymer to build up to the maximum its chemically resistant properties.

Alternatively, the compounded interpolymer material may be sheeted out and sulfurized in the sheet form preparatory to application to the container.

This is particularly convenient for the embodiment of Fig. 1 where the interpolymer material 1 is conveniently produced in tube form as indicated. The interpolymer material may conveniently be extruded, by the aid of a press, to form the desired tube, or it may be prepared by wrapping sheets of the material around a collapsible mandril. The metal duct or conveyor 2 is desirably treated on its inner surface with a thin layer of the compounded interpolymer substance in solvent to form an adhesive film 3. When the film of compounded interpolymer substance within the tube is substantially dry, the interpolymer material may be drawn into place in the tube. It may conveniently be extruded with a diameter considerably less than the internal diameter of the tube, and after being drawn into the tube it may be expanded by air or steam or water pressure within the tube until firm contact is made with the interior wall of the tube. If desired, the film may be converted into similar material to the fully resistant liner 1, by the application of heat as above pointed out. When so treated the lining interpolymer material 1 is firmly held to the metal portion 2.

The embodiments of Fig. 2 and Fig. 3 may conveniently be produced by fabrication of the material into the desired tank structures 4 and 6, and the incorporation thereinto of the polymer material linings 5 and 7 by either of the methods above pointed out. In either event the interpolymer material becomes firmly adherent to the surface of the tank structure, and becomes an integral part thereof.

The embodiment of Fig. 1 is particularly desirable as a duct for the conveyance of powerfully corrosive liquids either acid or alkaline. The embodiment of Fig. 2 is particularly desirable for the shipment of powerfully corrosive liquids, either acid or alkaline; and the embodiment of Fig. 3 is particularly desirable for the storage of such liquids.

It will be noted that the above presented formula for compounding the interpolymer material includes a small portion of clay. This is presented as a typical inert filler and it may be present in proportions ranging from 1 to 2 parts per hundred of interpolymer to amounts as high as 200 parts per hundred of interpolymer depending upon the particular substance chosen to serve as the inert filler. In addition to clay, carbon black is a highly advantageous filler material as is also barytes. Zinc oxide is useful for some purposes, but it is not fully suitable for all corrosive liquids. When strong nitric, sulfuric or hydrochloric acids are to be in contact with the interpolymer lining, zinc oxide is less satisfactory, since it shows some tendency to reduce the inertness of the compounded interpolymer. For the mild acids, and for alkalis, zinc oxide is a satisfactory inert filler as are also magnesium oxide and similar substances.

In some instances it is desired to package small amounts of substances such as small amounts of acid fruits, or small amounts of the more powerful acid and alkaline liquids. For this purpose the embodiment of Fig. 4 may be utilized. For use with acid fruits or food substances a satisfactory liner is readily obtained by coating the container with a solution of the compounded interpolymer to form a film 9, followed by a heating as above indicated to develop the full chemical resistivity of the lining material. In producing containers for small quantities of the more corrosive liquids such as nitric and sulfuric acids, the polymer substance may be moulded by the application of a low degree of heat and pressure into the desired form of the container and inserted therein with or without the intermediate presence of a layer of the interpolymer substance deposited from solution. The lining may then be heated for the appropriate time to develop the complete chemical resistivity.

The container, especially for comestibles, may be formed by the usual automatic machine process of rolling and seaming sheet iron, either with or without coatings of tin; and stamping and seaming to the rolled portion an appropriate bottom closure. The lining of interpolymer material may be applied to the container at this stage, and may be applied simultaneously to the appropriate surface of a stamped cover member. The heat treatment for completing the sulfurization may be applied to both portions of the structure after evaporation of the solvent. The comestible may then be inserted within the bottom portion, and the top cover may thereafter be "seamed" to the cylindrical portion by folding and rolling the edges together. It will be observed that this procedure avoids all necessity of soldering or similar treatment, in view of the fact that the elasticity of the interpolymer material permits the easy production of a tight seal between the various can members. Furthermore, the high heat resistance of the material permits of the sterilization of the comestible within the container, after completing the sealing.

The above-described embodiment suggests only the lining of the container with interpolymer. It is, however, readily possible to cover the container both inside and outside with the interpolymer material, thereby dispensing entirely with the use of tin as a rust preventive. Furthermore, the interpolymer is transparent, especially in thin layers, free from fillers and the desired label and other marks may be printed directly upon the metal of the container, and covered by the exterior layer of interpolymer. This embodiment is particularly advantageous, because of the very high strength and very high abrasion resistance of the interpolymer material, which is superior to that of the ordinary coating of tin as applied to commercial tin plate.

The material is particularly advantageous for the protection of metallic structures generally against corrosive influences from liquids, solids and gas. It is particularly advantageous as a container for solid caustic substances such as solid caustic soda or caustic potash, as well as for solutions of caustic either diluted or concentrated. The interpolymer material is particularly useful as a liner for ducts conveying corrosive gases such as sulfur dioxide, sulfur trioxide, hydrochloric acid gas and similar corrosive vapors either in the presence or absence of moisture.

The material is particularly advantageous for containers to hold hydrochloric acid gas, dissolved in water, which is exceedingly difficult to store in anything but glass and is rapidly contaminated with ferric chloride when in contact with any ferrous materials. The material is similarly advantageous as a liner for containers to hold acetic acid which also is difficult to store and transport without contamination. Similarly, the material is strongly resistant to caustic solutions and is particularly advantageous with storage and handling of concentrated caustic solutions.

The material is advantageous as a covering for such articles as acid buckets and similar containers which may be formed of a metal base, and covered on both inside and outside with the sulfurized polymer. The metal base may be pierced to allow a binding effect between inner and outer coverings of the polymer and the material may be bound to the metal by an interposed film of sulfurized interpolymer material deposited on the metal structure. Such a structure is particularly advantageous in view of its high strength and flexibility and, even though it is bent or otherwise abused and battered, breakage does not readily occur and the structure may be repaired for further use.

The material similarly is highly advantageous for such uses as storage battery cases, especially for automobile service where rubber has been found unsatisfactory. The frame of the battery case may be prepared as a metal form of any desired size and shape, which is then covered inside and out with the sulfurized interpolymer substance. The resulting battery case is highly advantageous for batteries used in automotive service, since it withstands the vibration and other abuse far better than any prior type of case. The interpolymer is far more resistant to acid than is soft rubber and it is wholly lacking in the brittleness which characterizes hard rubber, and, in addition, it has an acid resistance which is superior to even the best of hard rubber cases.

The material is further useful as a liner for blow cases or "acid eggs" since it is strongly resistant to the contained acid and when the interpolymer is used as a liner for steel, wood or porcelain vessels it is found to be amply strong to withstand the applied pressure.

Similarly, it is highly advantageous as a liner for autoclaves for moderate temperature service since the extreme chemical inertness permits of the handling of the very strongest of acids in such devices.

It is further highly advantageous as a liner for centrifugal pumps and as a covering for impellers, for the handling of acid and alkaline solutions and for the handling of liquids which are corrosive because of contained solids which tend to erode the metal of the pump.

It is also particularly adapted as a protective coating on the exterior of metallic structures. It is useful as a paint on ships' bottoms and it adheres strongly and provides long continued and thorough protection against corrosion from salt water. By virtue of its plasticity, it is impossible for marine growth to adhere. This nonadherence of marine growth can be still further promoted by incorporating into the interpolymer coating a layer of copper powder or copper pigment. Similarly, it is useful as a protection for steel piling, especially in salt water and also for wooden piling for which it provides valuable protection against marine growth.

It is also particularly adapted as a protective coating on the exterior of metallic structures which are subject to corrosive gases or vapors. The covering of interpolymer substance may be applied from solution, or in the form of sheets of material which may be applied in the form as originally compounded and then the maximum chemical resistance developed by an appropriate heat treatment, or the material may be heated in the sheet form to develop the maximum chemical resistance and then the finished sheets applied to the structure and held in place by an underlayer of material applied from solution.

The invention thus provides a metallic structure having a protective covering which is wholly resistant to the most powerful acid or alkaline corrosive effects, and which at the same time has a high elasticity, a high abrasion resistance, a high resistance to vibration, and a powerful adhesive character to the metallic structure.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. A corrosion resistant structure comprising in combination a container member and an integral covering layer comprising a predominately isoolefinic polymer characterized by a molecular weight within the range of 15,000 to 500,000, an iodine number within the range of one and 60, reactivity with curing agents, and when cured a tensile strength within the range of 350 pounds to 4500 pounds per square inch, in cured condition.

2. A corrosion resistant structure comprising in combination a container and a protective layer thereover comprising a synthetic polymer of cured isobutylene characterized by a molecular weight within the range of 15,000 to 500,000, an iodine number within the range of one and 60, reactivity with curing agents, and when cured a tensile strength within the range of 1000 pounds to 4500 pounds per square inch, in cured condition.

3. A corrosion resistant structure comprising a container and an integral protective layer, the said layer comprising a predominately isoolefinic interpolymer of an isoolefin and a diolefin characterized by a molecular weight within the range of 15,000 to 500,000, an iodine number within the range of one to 60, reactivity with curing agents, and when cured a tensile strength within the range of 1000 pounds to 4500 pounds per square inch.

4. A corrosion resistant structure comprising a container member and a covering and protective layer of predominately olefinic polymeric material thereon, the said polymer material comprising an interpolymer of isobutylene with a diolefin characterized by a molecular weight within the range of 15,000 to 500,000, an iodine number within the range of one to 60, reactivity with curing agents, and when cured a tensile strength within the range of 1000 pounds to 4500 pounds per square inch.

5. A corrosion resistant structure comprising a container member and an integral covering and protecting layer of predominately isoolefinic material, the said polymeric material comprising an interpolymer of isobutylene with a diolefin characterized by a molecular weight within the range of 15,000 to 500,000, an iodine number within the range of one to 60, reactivity with curing agents, and when cured a tensile strength within the range of 1000 pounds to 4500 pounds per square inch.

6. A corrosion resistant structure comprising a container member and an integral covering and protecting layer of predominately isoolefinic material, the said polymeric material comprising an interpolymer of isobutylene with pentadiene characterized by a molecular weight within the range of 15,000 to 500,000, an iodine number within the range of one to 60, reactivity with curing agents, and when cured a tensile strength within the range of 1000 pounds to 4500 pounds per square inch.

7. A corrosion resistant structure comprising a container member and an integral covering and protecting layer of predominately isoolefinic material, the said polymeric material comprising an interpolymer of isobutylene with isoprene characterized by a molecular weight of 15,000 to 500,000, an iodine number within the range of one and 60, reactivity with curing agents, and when cured a tensile strength within the range of 1000 pounds to 4500 pounds per square inch.

8. A corrosion resistant structure comprising a container member and an integral covering and protecting layer of predominately isoolefinic material, the said polymeric material comprising an interpolymer of isobutylene with dimethyl butadiene characterized by a molecular weight of 15,000 to 500,000, an iodine number within the range of one and 60, reactivity with curing agents and when cured a tensile strength within the range of 1000 to 4500 pounds per square inch.

9. A structure comprising a metallic member and an integral covering layer, the said layer comprising a solid, plastic, elastic, curable predominately isoolefinic polymer characterized by a molecular weight of 15,000 to 500,000, an iodine number within the range of one and 60, reactivity with curing agents, and when cured a tensile strength within the range of 1000 to 4500 pounds per square inch and comprising isobutylene and a diolefin cured by combination with a quinonoid nucleus substance.

10. A structure comprising a metallic member and an integral covering layer, the said layer comprising a solid, plastic, elastic, curable predominately isoolefinic polymer characterized by a molecular weight of 15,000 to 500,000, an iodine number within the range of one and 60, reactivity with curing agents, and when cured a tensile strength within the range of 1000 to 4500 pounds per square inch and comprising isobutylene and a diolefin cured by combination with sulfur and a sulfurization aid.

11. A structure comprising a metallic member and an integral covering layer, the said layer comprising a solid, plastic, elastic, curable predominately isoolefinic polymer characterized by a molecular weight of 15,000 to 500,000, an iodine number within the range of one and 60, reactivity with curing agents, and when cured a tensile strength within the range of 1000 to 4500 pounds per square inch and comprising isobutylene and a diolefin cured by combination with sulfur and tetramethylthiuram disulfide.

ROBERT M. THOMAS.
WILLIAM J. SPARKS.